(12) United States Patent
Backlund et al.

(10) Patent No.: US 8,739,719 B2
(45) Date of Patent: Jun. 3, 2014

(54) METHOD FOR OPERATING AN LNG FUELLED MARINE VESSEL AND A CORRESPONDING MARINE VESSEL

(75) Inventors: Leif Backlund, Kvevlax (FI); Mathias Jansson, Vaasa (FI)

(73) Assignee: Wartsila Finland Oy, Vaasa (FI)

( * ) Notice: Subject to any disclaimer, the term of this patent is extended or adjusted under 35 U.S.C. 154(b) by 38 days.

(21) Appl. No.: 13/378,254

(22) PCT Filed: Mar. 10, 2011

(86) PCT No.: PCT/FI2011/050209
§ 371 (c)(1), (2), (4) Date: Dec. 14, 2011

(87) PCT Pub. No.: WO2011/124748
PCT Pub. Date: Oct. 13, 2011

(65) Prior Publication Data
US 2012/0090527 A1    Apr. 19, 2012

(30) Foreign Application Priority Data
Apr. 9, 2010 (FI) .................................. 20105370

(51) Int. Cl.
B63B 25/08 (2006.01)
(52) U.S. Cl.
USPC ........................................ 114/74 R; 114/74 A
(58) Field of Classification Search
USPC .............................................. 114/74 A, 74 R
See application file for complete search history.

(56) References Cited

U.S. PATENT DOCUMENTS

| | | | |
|---|---|---|---|
| 3,926,134 A * | 12/1975 | Closner et al. | 114/74 R |
| 3,968,764 A * | 7/1976 | Kvamsdal et al. | 114/74 A |
| 4,135,465 A * | 1/1979 | Dudley et al. | 114/74 A |
| 4,241,683 A * | 12/1980 | Conway | 114/74 R |
| 4,449,472 A * | 5/1984 | Meyer, Jr. | 114/274 |
| 5,803,005 A * | 9/1998 | Stenning et al. | 114/72 |
| 6,135,044 A * | 10/2000 | Nielsen | 114/74 R |
| 6,267,069 B1* | 7/2001 | Keehan | 114/74 A |
| 7,610,869 B2* | 11/2009 | Thomas | 114/74 R |
| 7,726,358 B2* | 6/2010 | Hartono et al. | 141/82 |
| 2008/0071596 A1* | 3/2008 | Smith | 705/8 |
| 2008/0308175 A1* | 12/2008 | Lee et al. | 141/11 |
| 2012/0090527 A1* | 4/2012 | Backlund et al. | 114/74 R |

FOREIGN PATENT DOCUMENTS

| | | | |
|---|---|---|---|
| FR | 2 430 349 | 2/1980 | |
| KR | 20100065758 A | 6/2010 | |
| WO | WO 2009/063127 A1 | 5/2009 | |
| WO | WO 2009063127 A1 * | 5/2009 | B63B 27/24 |

* cited by examiner

Primary Examiner — Lars A Olson
Assistant Examiner — Jovon Hayes
(74) Attorney, Agent, or Firm — Muncy, Geissler, Olds & Lowe, P.C.

(57) ABSTRACT

A method for operating an LNG fuelled marine vessel having a propulsion system, a power plant and an LNG storage tank, whereby LNG is supplied as a gas fuel from the LNG storage tank to the power plant. The marine vessel deploys a fixed LNG storage tank and a removable LNG storage tank on board the marine vessel. In order to facilitate bunkering, the removable LNG storage tank is removed and replaced by another removable LNG storage tank at a bunkering facility.

7 Claims, 4 Drawing Sheets

METHOD FOR OPERATING AN LNG FUELLED MARINE VESSEL AND A CORRESPONDING MARINE VESSEL

TECHNICAL FIELD

This invention relates to a method for operating an LNG fuelled marine vessel, which marine vessel comprises a propulsion system, a power plant and an LNG storage tank, in which method LNG is supplied as a gas fuel from the LNG storage tank to the power plant, and in which method the marine vessel is refuelled at a bunkering facility according to the preamble of claim 1. This invention also relates to a corresponding marine vessel.

BACKGROUND ART

Marine vessels can be fuelled by LNG (Liquified Natural Gas). Clearly, as also with LNG, marine vessels need to be refuelled or bunkered at certain intervals. The bunkering operation usually takes place in port, but may also take place at other locations, e.g. at a floating bunkering facility out at sea.

The bunkering operation of an LNG fuelled marine vessel usually takes a long time. The reason for this is the temperature difference between LNG (normally about −162° C.) and the bunkering line (normally in ambient temperature, around +20° C.). This temperature difference causes the LNG to boil in the bunkering line, which leads to a two-phase flow of gas and liquid. The two-phase flow causes control problems and pressure pulses, which are harmful for the supply procedure and for the piping arrangements of the bunkering line. Consequently, in order to arrive at a functioning bunkering operation, the LNG flow rate has to be kept very low in the beginning of the operation in order to minimize, or at least in order to attempt to keep the pressure pulses at an acceptable level. After the bunkering line starts to cool down, the flow rate may slowly be increased. The bunkering operation consequently takes a very long time.

A typical practice and trend in marine vessel operation of today is shortened port times and high operating speeds, the latter with high energy consumption, which would necessitate a transfer of large amounts of fuel to the marine vessel in a short time. Such fast transfer of fuel is not available in the prior art.

SUMMARY OF INVENTION

An object of the present invention is to avoid the above mentioned problems and to achieve method for operating an LNG fuelled marine vessel providing a fast turn-around time at the bunkering facility. This object is attained by a method and a marine vessel according to the claimed invention.

The basic idea of the invention is to eliminate time consuming fuel transfer procedures, whilst maintaining an operative supply of LNG for a power plant on board the marine vessel. To this effect, the marine vessel deploys a fixed LNG storage tank and a removable LNG storage tank on board the marine vessel, whereby the removable LNG storage tank is removed and replaced by another removable LNG storage tank at the bunkering facility.

The removable LNG storage tank is connected to the fixed LNG storage tank when the removable LNG storage tank is deployed on the marine vessel, whereby LNG can be transferred from the removable LNG storage tank to the fixed LNG storage tank out at sea, and advantageously at a given rate during the operation of the marine vessel.

In order to allow a fast replacement of removable LNG storage tanks at a bunkering facility, the removable LNG storage tank that is deployed on the marine vessel is emptied before being disconnected from the fixed LNG storage tank, whereby the emptied removable LNG storage tank is removed from the marine vessel so that another removable LNG storage tank provided with LNG can be deployed on the marine vessel and connected to the fixed LNG storage tank.

The advantages of the invention are particularly relevant when the marine vessel is a marine vessel such as e.g. an offshore support vessel, a tug, a short sea ferry, or the like, whereby the very short bunkering time allows for keeping the marine vessel available for operation almost without any noticeable intervals.

BRIEF DESCRIPTION OF DRAWINGS

In the following the invention will be described, by way of example only, in more detail with reference to the attached schematic drawings, in which.

DETAILED DESCRIPTION

Figure 1:
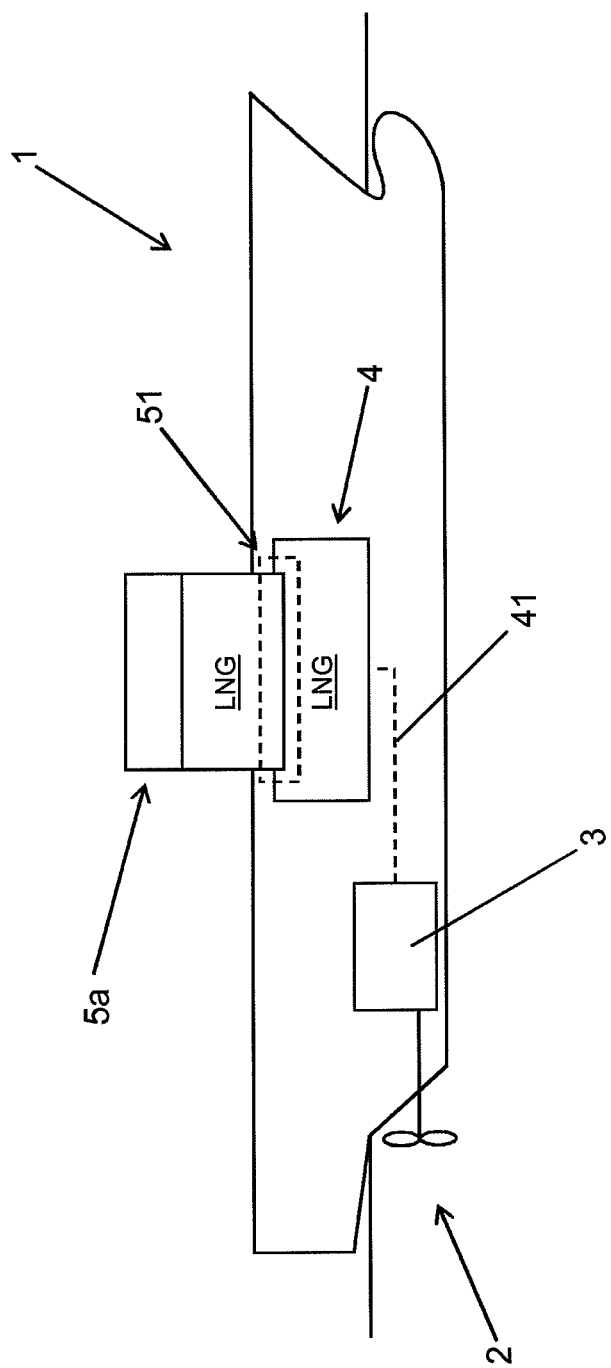
FIG. 1 illustrates a marine vessel at sea.

In the figures a marine vessel is generally indicated by reference numeral 1. The marine vessel comprises a propulsion system 2, a power plant 3 and a fixed LNG storage tank 4 on board the marine vessel 1. The fixed LNG storage tank 4 is connected to the power plant 3 by means of a fuel line 41. The power plant 3 is connected to the propulsion system 2 for providing driving power to the propulsion system.

The marine vessel 1 further comprises a removable LNG storage tank 5a or 5b, which is detachably connected to the fixed LNG storage tank 4 by means of a releasable connection line 51. The fixed LNG storage tank can be located above or below the main deck, whereby the removable LNG storage tank advantageously is arranged to be located on top of the fixed LNG storage tank. Clearly, the removable LNG storage tank can be arranged on the side of the fixed LNG storage tank or at another location on board the marine vessel as well.

The operation of the marine vessel 1 can shortly be described as follows.

When the marine vessel 1 is out at sea, as illustrated by FIG. 1, the power plant 3, or propulsion machinery, of the marine vessel 1 is driven by vaporized NG (Natural Gas) supplied from the fixed LNG storage tank 4. Normally LNG is supplied by way of a discharge conduit through a heat exchanger, where the LNG is vaporised, so that it is delivered in gas mode (NG) to a fuel feed line of the propulsion machinery. At the same time, when the marine vessel is operated out at sea, LNG is transferred from the deployed removable LNG storage tank 5a to the fixed LNG storage tank 4 at a given rate through the connection line 51. Both the fixed LNG storage tank 4 and the deployed removable LNG storage tank 5a contain LNG as indicated by reference LNG.

Figure 2:
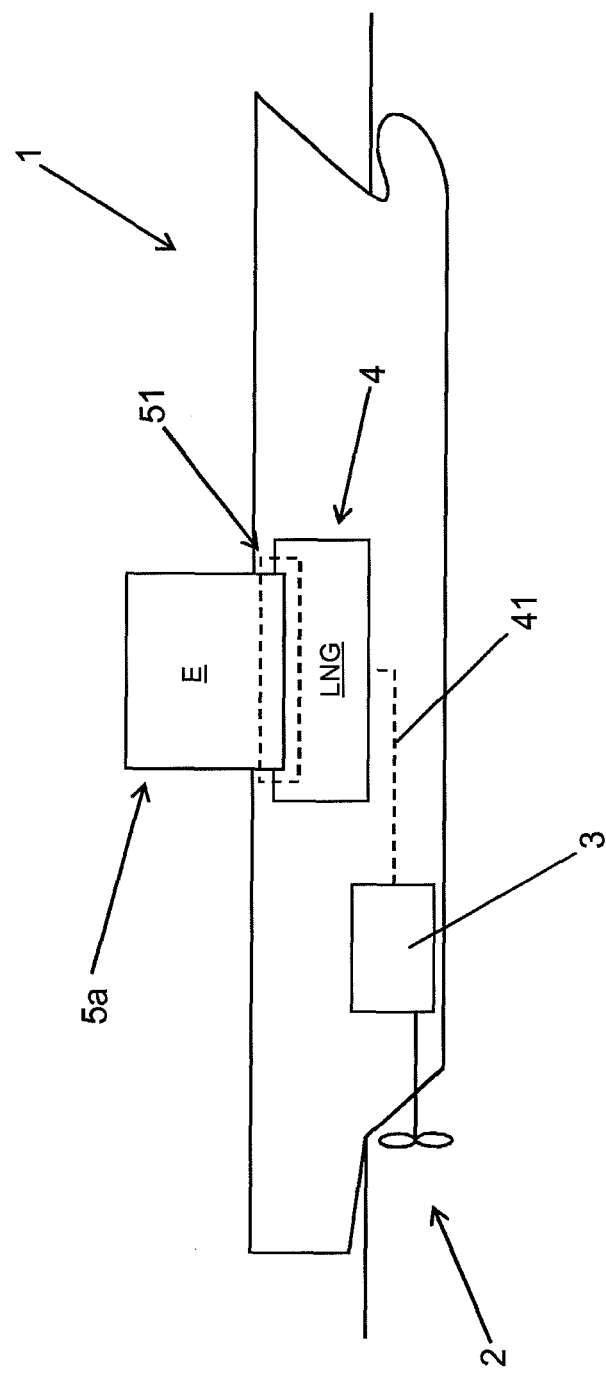
FIG. 2 illustrates the marine vessel arriving at a bunkering facility.

FIG. 2 shows the marine vessel 1 arriving at a bunkering facility, e.g. its port of destination. In addition to possible unloading and/or loading operations, it needs to be refuelled. Prior to the marine vessel 1 arriving at the bunkering facility, the removable LNG tank 5a is emptied (as indicated by reference E) before it is disconnected from the fixed LNG storage tank 4 on the marine vessel 1. In order to facilitate and speed up detachment, all connections, including the connection line 51 are heated.

LNG can still be supplied to the power plant 3 from the fixed LNG storage tank 4 in a constant manner, thus not disrupting the operation of the marine vessel. The amount of LNG left in the fixed LNG storage tank 4 should thus be sufficient to allow full operation, until another removable LNG tank 5b (provided with LNG) is appropriately connected to the fixed LNG storage tank 4, as discussed in connection with FIG. 3 in the following.

Figure 3:
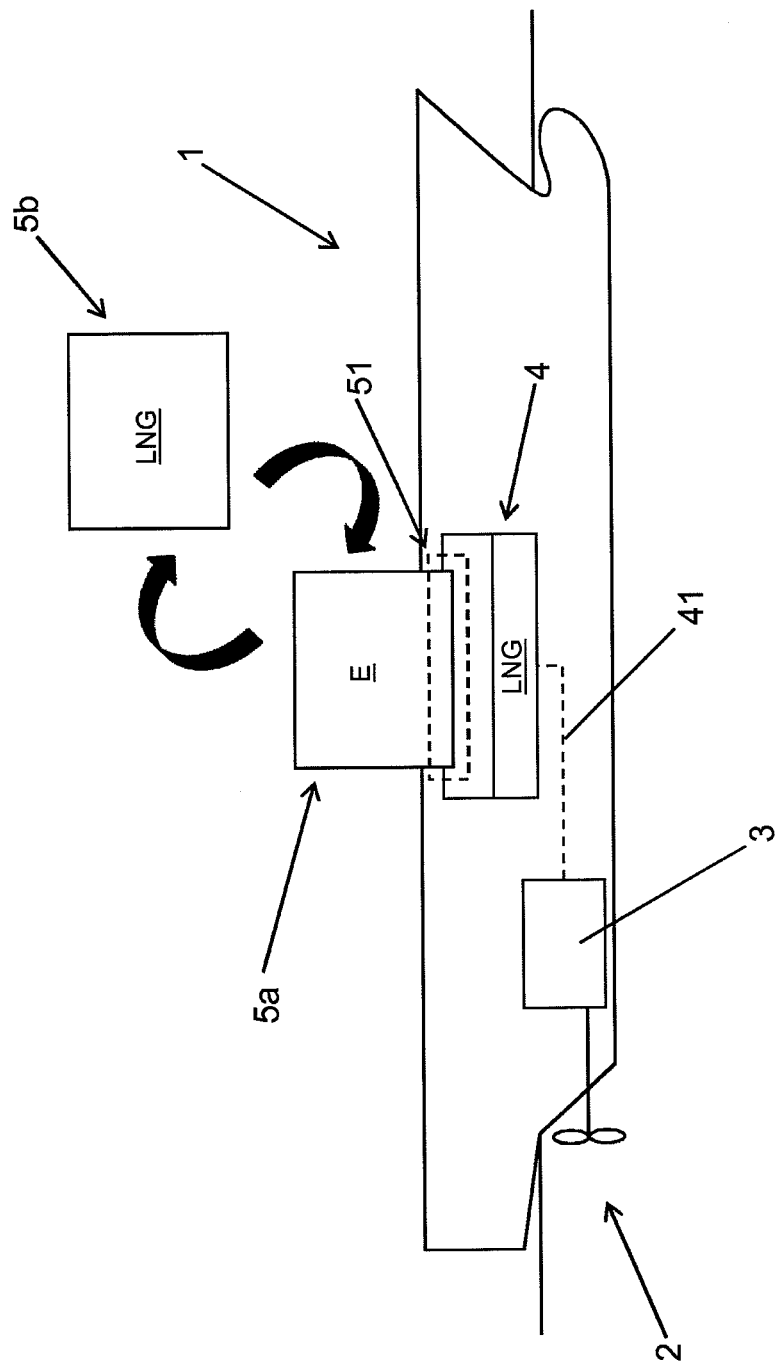
FIG. 3 illustrates the marine vessel at the bunkering facility.

FIG. 3 shows the marine vessel 1 at the bunkering facility. After the deployed removable LNG tank 5a has been emptied (as indicated by reference E) and the connections detached, the emptied removable LNG tank 5a on board the marine vessel 1 is replaced by another removable LNG tank 5b provided with LNG (as indicated by LNG). The replacement procedure is illustrated by block arrows. The marine vessel 1 can leave the bunkering facility, preferably after the removable LNG storage tank 5b, which is provided with LNG, has been connected to the fixed LNG storage tank 4 by means of the connecting line 51.

Figure 4:
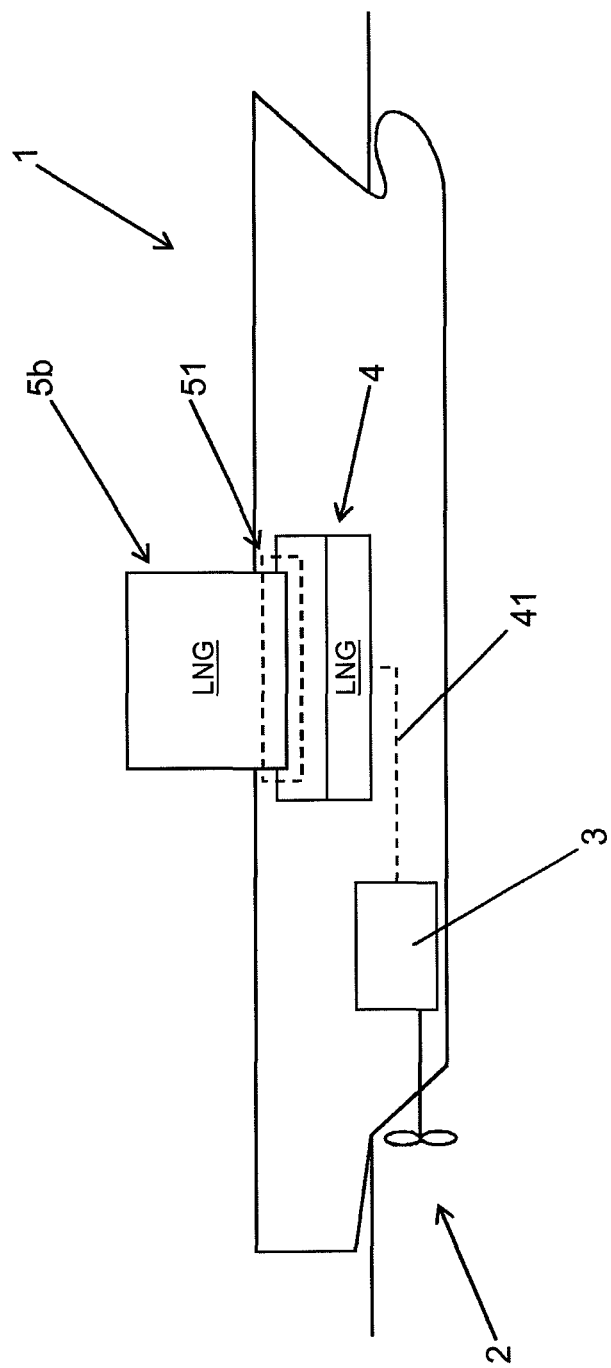
FIG. 4 illustrates the marine vessel at sea after a bunkering operation.

As shown in FIG. 4, the marine vessel 1 can continue its operations out at sea, while, as described above in connection with FIG. 1, LNG is transferred from the deployed removable LNG storage tank 5b to the fixed LNG storage tank 4 at a given rate through the connection line 51.

Consequently, the arrangement with a fixed LNG storage tank 4 on board the marine vessel 1 and a removable LNG storage for refuelling provides for a fast bunkering operation and a short port time. This is particularly advantageous when the marine vessel is a marine vessel such as e.g. an offshore support vessel, a tug, a short sea ferry, or the like, which preferably is in operational mode in a more or less constant fashion.

The LNG storage tanks and the fuel supply arrangement, including components like pumps, heat exchangers, compressors, connection and fuel supply lines, as well as valve means, are as such considered to be known by a person skilled in the art and are therefore not described in more detail in this connection.

The different stages of operation described above can be suitable controlled by appropriate automation systems. This is considered to lie within the knowledge of a skilled person in the art and is therefore not discussed in detail in this connection.

The description and the thereto related drawings are only intended to clarify the basic idea of the invention. The invention may vary in detail, such as to the number of fixed or removable LNG storage tanks, fuel lines, or other components, within the scope of the ensuing claims.

The invention claimed is:

1. A method for operating an LNG fuelled marine vessel, which marine vessel comprises a propulsion system, a power plant and an LNG storage tank,
   in which method LNG is supplied as a gas fuel from the LNG storage tank to the power plant, and
   in which method the marine vessel is refuelled at a bunkering facility,
   wherein the marine vessel deploys a fixed LNG storage tank on board the marine vessel, the marine vessel deploys a removable LNG storage tank on board the marine vessel, and the removable LNG storage tank is removed and replaced by another removable LNG storage tank at the bunkering facility, and
   wherein the removable LNG storage tank is connected to the fixed LNG storage tank when the removable LNG storage tank is deployed on the marine vessel so that the LNG can be transferred from the removable LNG storage tank to the fixed LNG storage tank.

2. The method according to claim 1, wherein LNG is transferred from the deployed removable LNG storage tank to the fixed LNG storage tank at a given rate during operation of the marine vessel at sea.

3. The method according to claim 1, wherein the removable LNG storage tank that is deployed on the marine vessel is emptied before being disconnected from the fixed LNG storage tank, the emptied removable LNG storage tank is removed from the marine vessel, another removable LNG storage tank provided with LNG is deployed on the marine vessel, and said another removable LNG storage tank provided with LNG is connected to the fixed LNG storage tank.

4. A marine vessel comprising a propulsion system, a power plant, and a fixed LNG storage tank connected to the power plant for supplying fuel to the power plant, wherein the marine vessel further comprises a removable LNG storage tank, and the removable LNG storage tank is arranged to be detachably connected to the fixed LNG storage tank by means of a releasable connection line, wherein the removable LNG storage tank is connected to the fixed LNG storage tank when the removable LNG storage tank is deployed on the marine vessel so that the LNG can be transferred from the removable LNG storage tank to the fixed LNG storage tank.

5. The marine vessel according to claim 4, wherein the fixed LNG storage tank is located above or below a main deck of the marine vessel, and in the removable LNG storage tank is arranged to be located on top of the fixed LNG storage tank.

6. A method for operating an LNG fuelled marine vessel, the marine vessel comprising a power plant and an LNG storage tank, the marine vessel deploying a removable LNG storage tank on board the marine vessel and a fixed LNG storage tank on the marine vessel, the method comprising:
   supplying LNG as a gas fuel from the LNG storage tank to the power plant; and
   refueling the marine vessel at a bunkering facility by:
      removing the removable LNG storage tank; and
      replacing the removable LNG storage by another removable LNG storage tank at the bunkering facility.

7. The method of the claim 6, further comprising
   connecting the removable LNG storage tank to the fixed LNG storage tank, when the removable LNG storage tank is deployed on the marine vessel; and
   transferring the LNG from the removable LNG storage tank to the fixed LNG storage tank.

* * * * *